United States Patent [19]

Gen et al.

[11] Patent Number: 4,505,421
[45] Date of Patent: Mar. 19, 1985

[54] SOLDERING METHODS AND DEVICES

[75] Inventors: Tamar G. Gen, Palo Alto; Edward A. Cydzik, San Mateo, both of Calif.

[73] Assignee: Raychem Corporation, Menlo Park, Calif.

[21] Appl. No.: 308,867

[22] Filed: Oct. 5, 1981

[51] Int. Cl.³ .............................................. B23K 35/36
[52] U.S. Cl. ................................... 228/224; 228/103; 148/23
[58] Field of Search ............ 228/223, 224, 103, 56 R, 228/214; 148/23

[56] References Cited

U.S. PATENT DOCUMENTS

| | | |
|---|---|---|
| 2,027,962 | 1/1936 | Currie . |
| 3,086,242 | 4/1963 | Cook et al. . |
| 3,087,238 | 4/1963 | Nottingham . |
| 3,239,125 | 3/1966 | Sherlock . |
| 3,305,625 | 2/1967 | Ellis . |
| 3,316,343 | 4/1967 | Sherlock . |
| 3,396,460 | 8/1968 | Wetmore . |
| 3,396,894 | 8/1968 | Ellis . |
| 3,451,609 | 6/1969 | Gillett . |
| 3,730,782 | 5/1973 | Poliak et al. ........................ 148/23 |
| 3,957,382 | 5/1976 | Greuel et al. . |
| 4,090,655 | 5/1978 | Tissot . |
| 4,137,369 | 1/1979 | Chaikin ......................... 228/56.5 X |
| 4,207,364 | 6/1980 | Nyberg . |
| 4,228,761 | 10/1980 | Glover et al. . |
| 4,304,959 | 12/1981 | Vidakovits et al. . |
| 4,344,909 | 8/1982 | DeBlauwe . |

FOREIGN PATENT DOCUMENTS

| | | |
|---|---|---|
| 2809461 | 9/1978 | Fed. Rep. of Germany . |
| 52-41478 | 10/1977 | Japan . |
| 53-15243 | 2/1978 | Japan . |
| 54-153293 | 12/1979 | Japan . |
| 689462 | 3/1953 | United Kingdom . |
| 1014080 | 12/1965 | United Kingdom . |
| 1132334 | 10/1968 | United Kingdom . |
| 1599520 | 10/1981 | United Kingdom . |
| 482264 | 6/1976 | U.S.S.R. .............................. 228/103 |

OTHER PUBLICATIONS

"Crayons, Paints, Labels Tell Part Temperature", Welding Design and Fabrication, Dec. 1981, p. 82.
"Transparent Flip Chip for Monitoring Flux Cleaning", IBM Technical Disclosure Bulletin, vol. 18, No. 10, Mar. 1976, p. 3231.
"One-Shot Temperature Indicators", Assembly Engineering, (Dec. 1979—pp. 14–15).

*Primary Examiner*—Kuang Y. Lin
*Attorney, Agent, or Firm*—Edith A. Rice; Herbert G. Burkard

[57] ABSTRACT

A heat-recoverable soldering device comprises a heat-recoverable member having a fusible solder insert and associated with the solder insert, a solder flux composition which undergoes a visible color change at a critical temperature. Solderable substrates are positioned within the device and heated until a critical temperature has been reached as indicated by a color change in the flux. The critical temperature depends on the material of the particular heat-recoverable member and the solder used. It is that temperature which is required to effect a solder joint between the substrates and recovery of the heat-recoverable member. Novel flux compositions and their use in soldering are also disclosed.

8 Claims, 2 Drawing Figures

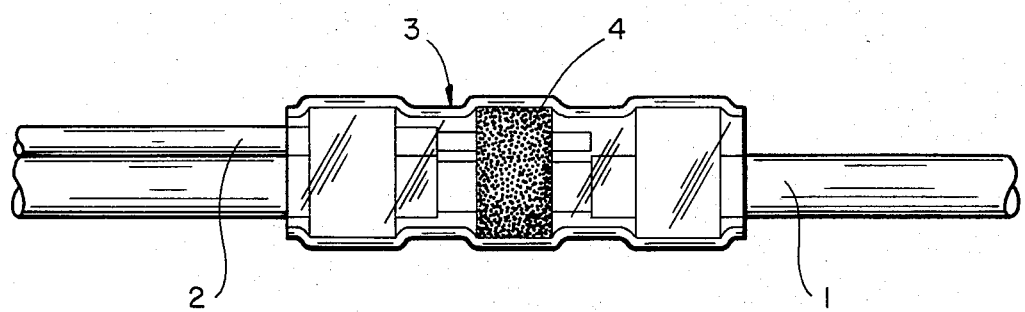
FIG_1
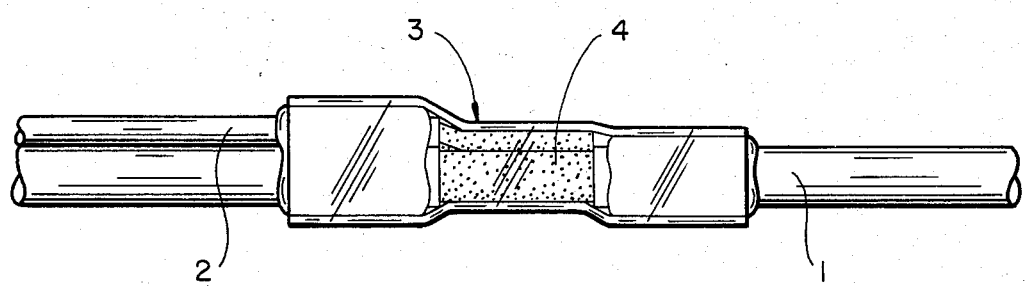
FIG_2

SOLDERING METHODS AND DEVICES

BACKGROUND OF THE INVENTION

This invention relates to a heat-recoverable soldering device having a solder insert and associated therewith, a temperature indicating solder flux composition, and to methods of soldering using said use of devices. It further relates to certain novel temperature indicating solder flux compositions and to the use of such compositions in soldering.

Heat-recoverable solder devices are known in the art. See, for example, U.S. Pat. Nos. 3,239,125 to Sherlock, 3,305,625 to Ellis, 3,316,343 to Sherlock, 3,396,460 to Wetmore and 3,396,894 to Ellis. Such heat-recoverable devices are generally heat-shrinkable polymeric sleeves having a fusible insert comprising solder. Elongate substrates, such as a pair of wires, are inserted into the sleeve and heat is applied causing the sleeve to shrink into contact with the substrates. The heat also causes the solder to melt and flow around the substrates. Upon cooling, a solid solder joint is formed between the substrates. In general, the temperature required to melt the solder is higher than the temperature required to shrink the sleeve. Thus, visual observation that the sleeve has completely recovered does not necessarily mean that the temperature necessary for soldering has been reached. There is, therefore, no visible indication during the soldering process that enough heat has been applied. Further, in the event that a soldered joint so formed fails during use, there is no way of subsequently inspecting the joint to determine whether the failure was due to inadequate heating during the soldering process.

This invention provides a direct, positive indication that a solder joint or connection has reached the correct soldering temperature. It provides this indication during the soldering process to indicate when adequate heat has been applied to effect the solder termination. Further, it provides a continuing indication after the soldering step has been completed, that adequate heat was applied during soldering. In a preferred embodiment, the completed soldered joint can be visually inspected to detect improperly formed terminations.

SUMMARY OF THE INVENTION

This invention provides a heat-recoverable soldering device having a fusible solder insert and, associated therewith, a flux composition which undergoes a change of color at the temperature required to effect a solder termination.

One aspect of this invention comprises a soldering device comprising:

(a) a transparent heat-recoverable polymeric member;

(b) a fusible solder insert positioned within said member; and (c) a solder flux composition which is associated with said solder insert and which undergoes a visible color change at a critical temperature.

Another aspect of this invention comprises a method of soldering at least two solderable elongate substrates which comprises:

(a) positioning said substrates within a heat-recoverable soldering device, said device comprising a transparent heat-recoverable polymeric member having a fusible solder insert positioned therein and, associated with said insert, a solder flux composition which undergoes a visible color change at a critical temperature;

(b) heating said device, thereby causing said heat-recoverable member to recover into contact with said substrates; and (c) continuing to heat said sleeve until said flux undergoes a visible color change.

A further aspect of this invention comprises a solder flux composition which comprises solder flux and a reactive component, flux composition undergoing a chemical reaction resulting in a visible color change at a critical temperature.

Yet another aspect of this invention comprises a method of making a solder termination which comprises:

(a) bringing at least two solderable elements into contact with each other;

(b) applying to said elements a quantity of solder together with a flux composition, said flux composition comprising solder flux and a reactive component, said flux composition undergoing a chemical reaction resulting in a visible color change at a critical temperature; and (c) applying heat to said substrates, solder and flux composition until a visible color change in said flux composition is observed.

BRIEF DESCRIPTION OF THE DRAWINGS

FIG. 1 is a side view of a typical heat-recoverable device of this invention having an insert of solder coated with a temperature indicating flux and two elongate substrates positioned within said device.

FIG. 2 is a side view of the device of FIG. 1 following recovery thereof and change in color of the temperature indicating flux on application of sufficient heat to effect a solder joint between the elongate substrates.

DETAILED DESCRIPTION OF THE INVENTION

The heat-recoverable soldering devices of this invention include a dimensionally heat-recoverable member. Such heat-recoverable members, and their use in soldering devices is known, for example, see above mentioned U.S. Pat. Nos. 3,239,125, 3,305,625, 3,316,343, 3,396,400 and 3,396,894, the disclosures of which are incorporated herein by reference. The heat-recoverable member is capable of undergoing a change in its dimensional configuration on application of heat. This change in dimensional configuration is usually toward an original shape from which it has previously been deformed, but the term "heat-recoverable", as used herein, also includes a member which, on heating, adopts a new configuration, even if it has not been previously deformed.

The heat-recoverable member generally comprises a heat-shrinkable sleeve made from a polymeric material exhibiting the property of elastic or plastic memory as described, for example, in U.S. Pat. Nos. 2,027,962 and 3,086,242, the disclosures of which are incorporated herein by reference. The original dimensionally heat-stable form may be a transient form in a continuous process in which, for example, an extruded tube is expanded, while hot, to a dimensionally heat-unstable form but, in other methods of preparation, a preformed dimensionally heat-stable article is deformed to a dimensionally heat-unstable form in a separate stage.

In the production of the heat-recoverable member, the polymeric material is generally cross-linked. One manner of producing a heat-recoverable article comprises shaping the polymeric material into the desired heat-stable form, subsequently cross-linking the polymeric material, heating the article to a temperature above the crystalline melting point, or for amorphous materials the softening point, of the polymer, deforming the article and cooling the article while in the deformed state so that the deformed state of the article is retained. In use, application of heat will cause the article to dimensionally recover from the deformed state to the original heat-stable shape.

In other articles, as described, for example, in U.S. Pat. No. 4,207,364, an elastomeric member such as an outer tubular member is held in a stretched state by a second member, such as an inner tubular member, which, upon heating weakens and thus allows the elastomeric member to recover.

Examples of polymers used in the manufacture of heat-recoverable articles include polyolefins, e.g. polyethylene and copolymers of ethylene with ethylenically unsaturated monomers, such as ethylene/ethyl acrylate, ethylene/vinyl acetate copolymers, polyvinyl chloride, elastomers, silicones, polytetrafluoroethylene, polyvinylidene fluoride, polyurethanes, and ionomers. The polymer can be cross-linked either by radiation or chemical means.

The heat-recovery temperature of crystalline polymers is generally a temperature slightly above the crystalline melting temperature. Polymers, such as polyvinyl chloride, which are not crystalline recover at about their glass transition temperature.

The heat-recoverable member used in the soldering device of this invention should be relatively transparent. The wall thickness of the member should be in the range of from about 0.0005 inch to about 0.05 inch and is preferably from about 0.0008 inch to about 0.01 inch.

In the soldering device of this invention, a solder insert is positioned within the heat-recoverable member. This can be done by coating solder onto the surface of the recoverable member. Alternatively, a solder preform of the desired configuration can be produced or then inserted into the heat-recoverable member. The solder is positioned such that when two solderable substrates are positioned within the device and the device is heated, the solder will be forced into intimate contact with the substrates by the recovery of the heat-recoverable member. When the heat-recoverable member is in the form of a heat-shrinkable sleeve, the solder will preferably be in the shape of a ring on the inner surface of the sleeve.

In soldering operations it is conventional to use a solder flux. The flux aids the flow of the solder and/or cleans the surfaces of the substrates to be joined. Various solder flux compositions are known and are commercially available. Widely used as solder fluxes are compositions based on natural rosin. Other fluxes include, for example, inorganic and organic acids. In use, the solder flux melts, flows and covers the substrate surface at a temperature below the melting point of the solder. Thus the particular flux used will depend of the nature of the solder in a given application. Any solder flux can be used in accordance with this invention. The particular flux and the appropriate temperature indicating component to be used in a particular application can be readily ascertained by one skilled in the art without undue experimentation.

The solder flux is associated with the solder of the heat-recoverable soldering device. Any of the conventional means for associating flux with solder can be used. For example, a solder preform can be coated with flux by spraying, dipping, brushing or the like, usually before it has been positioned within the heat-recoverable device. The solder flux can also be used in soldering operations such as hand soldering, in which a heat-recoverable device is not employed. In this event, the flux can be coated on the solder or can be positioned within the solder, for example, in the form of a core which can be in various configurations as is well known in the art. The flux must be visible during the soldering process to detect the color change in the flux when it reaches the appropriate temperature. It has been found that if the flux is positioned as a core within the solder, flow of the flux on heating renders it visible. Continued heating brings about a visible color change when the soldering temperature has been reached.

In accordance with this invention, the solder flux composition contains a temperature indicator such that the flux undergoes a color change when heated to the appropriate soldering temperature. The color change is preferably an irreversible color change as this will provide a permanent means for determining whether the soldered joint was heated to the required temperature during soldering.

The color change of the flux is preferably from a colored state to a colorless one. The completed solder joint is then visible for inspection. In this way, the joint itself can be inspected for adequate soldering, as well as for application of sufficient heat by the change in color of the flux.

The flux composition changes color at a critical temperature. This temperature varies depending on the particular solder used. The critical temperature is that temperature which is required to effect a solder termination with the particular solder, that is the temperature required to cause the solder to melt, flow and wet the substrates so that on cooling the solder makes a mechanical and electrical bond between the substrates being soldered. The particular solder to be used varies depending on the substrates being joined and the material of the heat-recoverable member. The temperature required to effect the solder termination is above the temperature required to cause recovery of the heat-recoverable member.

Since the critical temperature varies with the nature of the solder, the temperature indicating component of the flux composition varies depending on the solder used. Generally, the flux composition should undergo a color change in the temperature range of from about 150° C. to about 450° C., preferably from about 200° C. to about 240° C. The temperature of the color change should be in the range of from about 20° C. to about 60° C. above the melting point of the solder. In general, it should be about 20° C. to about 30° C. above the melting point of low temperature solder and about 30° C. to about 60° C. above the melting point of high temperature solder.

As stated above, the flux composition contains a temperature indicator such that at a critical temperature the flux composition undergoes a color change. Various temperature indicators can be used, for example, azo dyes such as Pigment Red 73 (an azo dye prepared from 2-nitro-p-toluidine and 2-naphthol, CI 12120), acid-base indicators such as Thymol blue, diazo dyes such as Acid Red 73 (a diazo dye derived from p-phenylazoaniline and 2-naphthol-6,8-disulfonic acid, CI 27290), and the like. In general, any dye which is compatible with the flux and which undergoes a color change at a critical temperature can be used.

Preferred temperature indicators are those which undergo a chemical reaction with the solder flux at a critical temperature. Compositions comprising a solder flux and a chemically reactive component which reacts with the flux to produce a color change at a critical temperature are novel. Particularly, preferred are flux compositions in which, at a critical temperature, the reactive component causes the flux composition to become colorless. The chemically reactive component can be, for example, Bromocresol Green, Basic Fuchsine or Thymol Blue.

The temperature indicator is incorporated into a solder flux composition by known techniques. The amount of temperature indicator incorporated into the flux is generally in the range of from about 0.01 to about 5 parts per 100 parts of flux and is preferably from about 0.05 to about 2 parts. The amount added depends on the intensity of the color. Sufficient temperature indicator should be added to provide a flux composition which is clearly visible during the soldering operation. The flux composition can also contain additives including, for example, dispersing aids such as water, alcohol or a subfactant or emulsifier, buffers, such as an acid or salt to maintain the desired pH, for example, oxalic acid, lactic acid, maleic acid, tartaric acid, fumaric acid or citric acid, stabilizers and the like.

A typical soldering device of this invention and its use in shield termination of coaxial cables is illustrated in FIG. 1. In FIG. 1, a heat-recoverable tubular member, or sleeve, 3, has a solder insert, 4. In this embodiment, the sleeve, 3, is a heat-shrinkable tube of radiation cross-linked ethylene-tetrafluoroethylene copolymer containing fusible thermoplastic inserts toward each end of the tube. Prior to being positioned within the sleeve, 3, the solder insert, 4, was coated with a temperature indicating flux in accordance with this invention. The coated flux was dark blue in color obscuring the grey color of the solder insert.

The unrecovered sleeve, 3, is positioned over a coaxial cable, 1, having a portion of the outer insulation removed to expose the underlying shield and the end region of the ground wire, 2, with the insulation being removed from the end region. The sleeve, 3, is then heated causing it to shrink into contact with the cable and ground wire and to cause the solder to melt and flow. On heating, the flux changes color at a temperature above the melting point of the solder becoming colorless. Heating is discontinued at this point. During heating of the sleeve, the thermoplastic inserts melt and seal the sleeve to the cable. The resulting product is shown in FIG. 2. In FIG. 2, sleeve 3, has shrunk into contact with and is sealed to the cable, 1. As the flux is now colorless, the grey color of the solder, 4, is visible through the sleeve. The solder has now affected a termination between the shield of 1 and the exposed tip of ground wire, 2.

EXAMPLES 1-14

Temperature indicating solder flux compositions were prepared by dispersing various dyes in a Milros #611, a commercially available rosin-based flux comprising 37% of a mixture of rosin isomers in 63% isopropyl alcohol. The dyes used and the concentrations of dye in the resulting temperature indicating flux compositions are listed in Table 1. Additives, as listed in Table 1, were added as appropriate to aid in dissolution of the pigment or to buffer the solution to maintain the desired pH. The dyes used are:

Acid Red 73 (commercially available as Scarlet M Crude), a diazo dye derived from p-phenylazoaniline and 2-naphthol-6,8-disulfonic acid. (Color Index, CI, 27290).

Pigment Red 3 (commercially available as Atlasol Spirit Red-3) an azo dye prepared from 2-nitro-p-toluidine and 2-naphthol. (CI 12120).

Thymol Blue, commercially available and also referred to as thymolsulfonphthalien.

Pigment Red 52 (commercially available as Garnet Toner #2), an azo dye derived from 2-amino-5-chloro-p-toluenesulfonic acid and 3-hydroxy-2-naphthoic acid. (CI 15860).

Bromocresol Green, also known as 3',3'',5',5''-tetrabromo-m-cresolsulfonphthalein.

Solvent Red 24, (commercially available as Atlasol Red 4B) an azo dye derived from 4-O-tolylazo-o-toluidine and 2-naphthol. (CI 26105).

Pigment Yellow 5 (also known as Lithol Fast Yellow Y) an azo dye derived from o-nitroaniline and acetoacetanilide. (CI 11660).

Basic Violet 14, also known as Basic Fuchsine, and derived from aniline and toluidine. (CI 42510).

Pigment Orange 2 (commercially available as Ozark Orange X-1481) an azo dye derived from o-nitro-aniline and 2-naphthol. (CI 12060).

The flux composition was coated onto a solder preform which was then positioned within a heat-shrinkable sleeve made from cross-linked polyvinylidene fluoride. A solderable substrate, specifically an insulated wire with insulation removed from a segment, was inserted into the sleeve so that the uninsulated segment was positioned inside the sleeve. The sleeve was then heated causing the sleeve to shrink down onto the wire. Initial color of the flux composition was noted. The temperature at which the flux composition changed color and the final color of the flux was recorded.

TABLE 1

TEMPERATURE INDICATING FLUX COMPOSITIONS

| Example | Dye | Conc. | Additive | Conc. | Initial Color | Final Color | Temp. of Color Change |
|---|---|---|---|---|---|---|---|
| 1 | Acid Red 73 | 0.5% | Water | 10% | purple-maroon | colorless | 220° C. |
| 2 | Pigment Red 3 | 0.5% | — | — | orange-red | light orange | 250° C. |
| 3 | Pigment Red 3 | 1.0% | — | — | orange-red | light orange | 250° C. |
| 4 | Thymol Blue | 1.0% | maleic acid | 3% | dark purple | colorless | 220° C. |
| 5 | Thymol Blue | 0.5% | tartaric acid | 3% | dark purple | colorless | 220° C. |
| 6 | Thymol Blue | 1.0% | citric acid | 6% | dark purple | colorless | 220° C. |
| 7 | Pigment Red 52 | 1.5% | — | — | pink-purple | colorless | 220° C. |
| 8 | Pigment Red 52 | 2.0% | — | — | pink-purple | colorless | 220° C. |
| 9 | Pigment | 3.0% | — | — | pink-purple | colorless | 220° C. |

TABLE 1-continued

TEMPERATURE INDICATING FLUX COMPOSITIONS

| Example | Dye | Conc. | Additive | Conc. | Initial Color | Final Color | Temp. of Color Change |
|---|---|---|---|---|---|---|---|
| 10 | Red 52 Bromocresol Green | 1.0% | — | — | green | colorless | 250° C. |
| 11 | Solvent Red 24 | 0.5% | — | — | red | colorless | 300° C. |
| 12 | Basic Fuchsine | 0.5% | — | — | purple-red | yellowish | 260° C. |
| 13 | Basic Fuchsine | 0.5% | maleic acid | 3% | purple-red | colorless | 240–245° C. |
| 14 | Pigment Orange 2 | 1.5% | — | — | orange | light yellow | 240° C. |

The use of the temperature indicating solder flux composition of this invention has been described above with reference to its use in a soldering device of the heat-recoverable sleeve-type. The novel temperature indicating flux composition can be used in other soldering methods, for example, hand soldering. The temperature indicating flux can be applied in the same manner as flux is usually applied in the particular soldering method, and will change color at the critical temperature. The flux can be coated onto a solder preform or incorporated into the solder. It is also possible to apply the flux to the substrate(s) to be soldered.

The present invention has been described with reference to certain preferred embodiments thereof, other embodiments and variations are possible. Therefore, the spirit and scope of the appended claims should not necessarily be limited to description of the preferred embodiments contained herein.

What is claimed is:

1. A soldering device comprising:
   (a) a transparent heat-recoverable polymeric member;
   (b) a fusible solder insert positioned within said member; and
   (c) a solder flux composition which is associated with said solder insert and which undergoes a visible color change as the soldering temperature; wherein said solder flux undergoes a color change from a colored state to a colorless state.

2. A soldering device comprising:
   (a) a transparent heat-recoverable polymeric member;
   (b) a fusible solder insert positioned within said member; and
   (c) a solder flux composition
said device containing a thermochromic indicator which undergoes an irreversible color change from a colored state to a colorless state at the soldering temperature.

3. A device in accordance with claim 2 wherein said heat recoverable polymeric member is a heat-shrinkable tubular article.

4. A device in accordance with claim 2 wherein said thermochromic indicator is thymolsulfonphthalein.

5. A device in accordance with claim 2 wherein said thermochromic indicator is an azo dye derived from 2-amino-5-chloro-p-toluenesulfonic acid and 3-hydroxy-2-naphthoic acid.

6. A device in accordance with claim 2 wherein said thermochromic indicator is 3′,3″,5′,5″-tetrabromo-m-cresolsulfonphthalein.

7. A device in accordance with claim 2 wherein said thermochromic indicator is an azo dye derived from 4-o-tolylazo-o-toluidine and 2-naphthol.

8. A device in accordance with claim 2 wherein said thermochromic indicator is an azo dye derived from aniline and toluidine.

* * * * *